United States Patent
Haess et al.

(10) Patent No.: US 9,977,680 B2
(45) Date of Patent: May 22, 2018

(54) CLOCK-GATING FOR MULTICYCLE INSTRUCTIONS

(71) Applicant: International Business Machines Corporation, Armonk, NY (US)

(72) Inventors: Juergen Haess, Schoenaich (DE); Cédric Lichtenau, Boeblingen (DE); Stefan Payer, Boeblingen (DE); Kerstin C. Schelm, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/282,077

(22) Filed: Sep. 30, 2016

(65) Prior Publication Data

US 2018/0095767 A1 Apr. 5, 2018

(51) Int. Cl.
*G06F 9/38* (2006.01)
*G06F 1/32* (2006.01)

(52) U.S. Cl.
CPC .......... *G06F 9/3869* (2013.01); *G06F 1/3287* (2013.01)

(58) Field of Classification Search
CPC ..................................... G06F 1/3287
USPC ........................ 713/324, 300, 320
See application file for complete search history.

(56) References Cited

U.S. PATENT DOCUMENTS

| | | | | |
|---|---|---|---|---|
| 5,452,401 A | * | 9/1995 | Lin | G06F 1/3203 712/E9.063 |
| 5,666,537 A | * | 9/1997 | Debnath | G06F 1/3203 712/32 |
| 5,953,237 A | * | 9/1999 | Indermaur | G06F 1/3203 700/295 |
| 6,202,163 B1 | * | 3/2001 | Gabzdyl | G06F 1/3203 712/E9.028 |
| 6,604,202 B1 | * | 8/2003 | Nishii | G06F 9/30145 712/208 |
| 7,137,021 B2 | * | 11/2006 | Dhong | G06F 1/3203 713/322 |
| 7,441,136 B2 | * | 10/2008 | Feekes, Jr. | G06F 9/30145 712/E9.028 |
| 9,360,920 B2 | | 6/2016 | Hancock | |
| 9,378,146 B2 | | 6/2016 | Blomgren et al. | |
| 9,710,277 B2 | * | 7/2017 | Madduri | G06F 1/3287 |
| 2004/0221185 A1 | * | 11/2004 | Bose | G06F 1/3203 713/300 |

(Continued)

FOREIGN PATENT DOCUMENTS

JP 4800582 B2 10/2011

OTHER PUBLICATIONS

Mohit Arora, "The Art of Hardware Architecture: Design Methods and Techniques,", 2012, Springer Science+Business Media, Chap. 2, pp. 11-49.*

(Continued)

*Primary Examiner* — Yuqing Xiao
(74) *Attorney, Agent, or Firm* — Cantor Colburn LLP; Steven Chiu

(57) ABSTRACT

A system and a method of clock-gating for multicycle instructions are provided. For example, the method includes enabling a plurality of logic blocks that include a subset of multicycle (MC) logic blocks and a subset of pipeline logic blocks. The method also includes computing a precise enable computation value after a plurality of cycles of executing an instruction, and disabling one or more of the subset of multicycle (MC) logic blocks based on the precise enable computation value. Also, at least the subset of pipeline logic blocks needed to compute the instruction remains on.

17 Claims, 9 Drawing Sheets

(56) References Cited

U.S. PATENT DOCUMENTS

| | | | |
|---|---|---|---|
| 2005/0223253 A1* | 10/2005 | Marchand | G06F 1/3203 |
| | | | 713/322 |
| 2007/0074054 A1 | 3/2007 | Chieh | |
| 2010/0325452 A1* | 12/2010 | Sundaresan | G06F 1/3203 |
| | | | 713/320 |
| 2013/0262896 A1* | 10/2013 | Yoneda | G06F 1/324 |
| | | | 713/322 |
| 2014/0047258 A1 | 2/2014 | Eastlack | |
| 2014/0122555 A1* | 5/2014 | Hickmann | G06F 7/483 |
| | | | 708/523 |
| 2015/0220345 A1 | 8/2015 | Corbal et al. | |
| 2015/0301584 A1 | 10/2015 | Sideris et al. | |
| 2017/0220100 A1* | 8/2017 | DiBene, II | G06F 1/3287 |
| | | | 713/310 |

OTHER PUBLICATIONS

Li et al., "DCG: Deterministic Clock-Gating for Low-Power Microprocessor Design," Mar. 2004, IEEE Transactions on Very Large Scale Integration (VLSI) Systems, vol. 12, No. 3, pp. 245-254.*

Osamu Takahashi, et al.; Power-Conscious Design of the Cell Processor's Synergistic Processor Element; IEEE Micro, vol. 25 Issue 5, Sep. 2005; pp. 10-18.

David Brooks et al., "Value-based clock gating and operation packing . . . " ACM Transactions on Computer Systems, Association for Computing Machinery, Inc. U.S., vol. 18, No. 2, May 2000, pp. 89-126.

International Search Report and Written Opinion for International Application No. PCT/EP2017/074546, International Filing Date Sep. 29, 2017, dated Dec. 15, 2017, 12 pages.

* cited by examiner

| data | type of op | mc |
|---|---|---|
| Add32 | Addition | No |
| Add64 | Addition | No |
| Sub32 | Subtract | No |
| SubBCD | Subtract | No |
| Multiply 64 | Multiplication | Yes |
| Multiply128 | Multiplication | Yes |
| ConvToBCD | Convert | Yes |
| ConvToBindary | Convert | Yes |
| ... | | |

FIG. 8

CLOCK-GATING FOR MULTICYCLE INSTRUCTIONS

BACKGROUND

The subject matter disclosed herein generally relates to clock-gating and, more particularly, to clock-gating for multicycle instructions.

Modern processor designs can contain millions of latches. These latches are carefully gated and controlled at least in part because of power and heat considerations. For example, if all the latches in a modern processor were clocked every cycle the processor chip would likely fail from heat and strain or need to run at much lower frequency. If the chip could sustain such clocking the power consumption would be immense and the heat dissipation system and structure necessary would need to be large and complex. Further, constant clocking of the latches may shorten the life of the processor by increasing the rate of degradation of the circuit latches.

Thus, clock gating is important to achieving the thermal design power (TDP) which is the maximum amount of heat generated by a computer chip or component that the cooling system in a computer is designed to dissipate in typical operation. While pipelined instructions can be relatively easily clock-gated by activating the cycles of the pipeline one at time as the instruction transition thru the stages, other accesses or multicycle instructions present with a number of challenges that make it difficult to clock-gate. For example, existing pre-indicators marking which stages of the pipeline to activate and for how many cycles the pipeline stage should be active do not exist or are very imprecise for other accesses and/or multicycle instructions. Further, a local detection is complex and happens only very late. This causes a significant block of logic, many thousands of latches, being constantly clocked as soon as e.g. an instruction or an imprecise pre-indicator event is detected. Thus, because the clocking for multicycle operations is not gated, this clocking is run permanently causing unnecessary power consumption and heating. This consumption of considerable energy as well as heat dissipation resources are therefore consumed and therefore cannot be used for additional logic that would increase performance.

Accordingly, there is a desire to provide a system and/or method for handling clock-gating for multicycle instructions.

BRIEF DESCRIPTION

According to one embodiment a method of clock-gating for multicycle instructions is provided. The method includes enabling a plurality of logic blocks that include a subset of multicycle (MC) logic blocks and a subset of pipeline logic blocks. The method also includes computing a precise enable computation value after a plurality of cycles of executing an instruction, and disabling one or more of the subset of multicycle (MC) logic blocks based on the precise enable computation value. Also, at least the subset of pipeline logic blocks needed to compute the instruction remain on.

In addition to one or more of the features described above, or as an alternative, further embodiments may include computing an imprecise enable computation value before execution of the instruction begins, and enabling an imprecise startup subset of logic blocks from the plurality of logic blocks based on the imprecise enable computation value. The imprecise startup subset includes one or more of the multicycle logic blocks and one or more of the pipeline logic blocks.

In addition to one or more of the features described above, or as an alternative, further embodiments may include grouping the subset of pipeline logic blocks from the plurality of logic blocks into a pipeline clock domain, and grouping the subset of MC logic blocks from the plurality of logic blocks into a MC clock domain.

In addition to one or more of the features described above, or as an alternative, further embodiments may include holding the plurality of logic blocks enabled for the plurality of cycles needed to compute the precise enable computation value using at least a control latch and an OR gate.

In addition to one or more of the features described above, or as an alternative, further embodiments may include, wherein the OR gate at least provides an output signal to a line circuit breaker (Lcb) that processes a received output signal from the OR gate and provides one of an enable clock signal and a disable signal to the subset of MC logic blocks based on the received output signal.

In addition to one or more of the features described above, or as an alternative, further embodiments may include, wherein the OR gate receives inputs from the control latch and a valid input signal that is received.

In addition to one or more of the features described above, or as an alternative, further embodiments may include holding the plurality of logic blocks enabled for the plurality of cycles needed to compute the precise enable computation value using at least a control latch and an OR gate, wherein the control latch is provided in the MC clock domain, and wherein the OR gate is provided outside both the MC clock domain and the pipeline clock domain.

In addition to one or more of the features described above, or as an alternative, further embodiments may include holding the plurality of logic blocks enabled for the plurality of cycles needed to compute the precise enable computation value using at least a control latch, at least one OR gate, at least one holding latch.

In addition to one or more of the features described above, or as an alternative, further embodiments may include holding the plurality of logic blocks enabled for the plurality of cycles needed to compute the precise enable computation value using at least a control latch, a first OR gate, a second OR gate, a first holding latch, and a second holding latch, wherein the first holding latch and the second holding latch each provide an additional cycle of holding.

In addition to one or more of the features described above, or as an alternative, further embodiments may include, wherein a plurality of holding latches and corresponding OR gates are provided to hold the plurality of logic blocks for a plurality of cycles equal to a number of holding latches in the plurality of holding latches.

According to an embodiment, a system for clock-gating for multicycle instructions is provided. The system includes a memory having computer readable instructions, and a processor configured to execute the computer readable instructions. The computer readable instructions include enabling, in the processor, a plurality of logic blocks that include a subset of multicycle (MC) logic blocks and a subset of pipeline logic blocks, computing, using the processor, a precise enable computation value after a plurality of cycles of executing an instruction, and disabling, in the processor, one or more of the subset of multicycle (MC) logic blocks based on the precise enable computation value. Also, at least the subset of pipeline logic blocks needed to compute the instruction remains on.

In addition to one or more of the features described above, or as an alternative, further embodiments may include computing, using the processor, an imprecise enable computation value before execution of the instruction begins, and enabling, in the processor, an imprecise startup subset of logic blocks from the plurality of logic blocks based on the imprecise enable computation value. The imprecise startup subset includes one or more of the multicycle logic blocks and one or more of the pipeline logic blocks.

In addition to one or more of the features described above, or as an alternative, further embodiments may include grouping, using the processor, the subset of pipeline logic blocks from the plurality of logic blocks into a pipeline clock domain, and grouping, using the processor, the subset of MC logic blocks from the plurality of logic blocks into a MC clock domain.

In addition to one or more of the features described above, or as an alternative, further embodiments may include holding the plurality of logic blocks enabled for the plurality of cycles needed to compute the precise enable computation value using at least a control latch and an OR gate.

In addition to one or more of the features described above, or as an alternative, further embodiments may include wherein the OR gate at least provides an output signal to a line circuit breaker (Lcb) than processes a received output signal from the OR gate and provides one of an enable clock signal and a disable signal to the subset of MC logic blocks based on the received output signal, and wherein the OR gate receives inputs from the control latch and a valid input signal that is received.

In addition to one or more of the features described above, or as an alternative, further embodiments may include holding the plurality of logic blocks enabled for the plurality of cycles needed to compute the precise enable computation value using at least a control latch and an OR gate, wherein the control latch is provided in the MC clock domain, and wherein the OR gate is provided outside both the MC clock domain and the pipeline clock domain.

In addition to one or more of the features described above, or as an alternative, further embodiments may include holding the plurality of logic blocks enabled for the plurality of cycles needed to compute the precise enable computation value using at least a control latch, at least one OR gate, at least one holding latch.

In addition to one or more of the features described above, or as an alternative, further embodiments may include holding the plurality of logic blocks enabled for the plurality of cycles needed to compute the precise enable computation value using at least a control latch, a first OR gate, a second OR gate, a first holding latch, and a second holding latch, wherein the first holding latch and the second holding latch each provide an additional cycle of holding.

In addition to one or more of the features described above, or as an alternative, further embodiments may include, wherein a plurality of holding latches and corresponding OR gates are provided to hold the plurality of logic blocks for a plurality of cycles equal to a number of holding latches in the plurality of holding latches.

According to an embodiment, a computer program product to for clock-gating for multicycle instructions is provided. The computer program product including a computer readable storage medium having program instructions embodied therewith. The program instructions executable by a processor to cause the processor to enable a plurality of logic blocks that include a subset of multicycle (MC) logic blocks and a subset of pipeline logic blocks, compute a precise enable computation value after a plurality of cycles of executing an instruction, and disable one or more of the subset of multicycle (MC) logic blocks based on the precise enable computation value. Also, at least the subset of pipeline logic blocks needed to compute the instruction remains on.

The foregoing features and elements may be combined in various combinations without exclusivity, unless expressly indicated otherwise. These features and elements, as well as the operation thereof, will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 8 is a table that indicates some examples of instruction that are detected in the payload of the received data for the instructions and what they correspond too in accordance with one or more embodiments.

DETAILED DESCRIPTION

Figure 1:
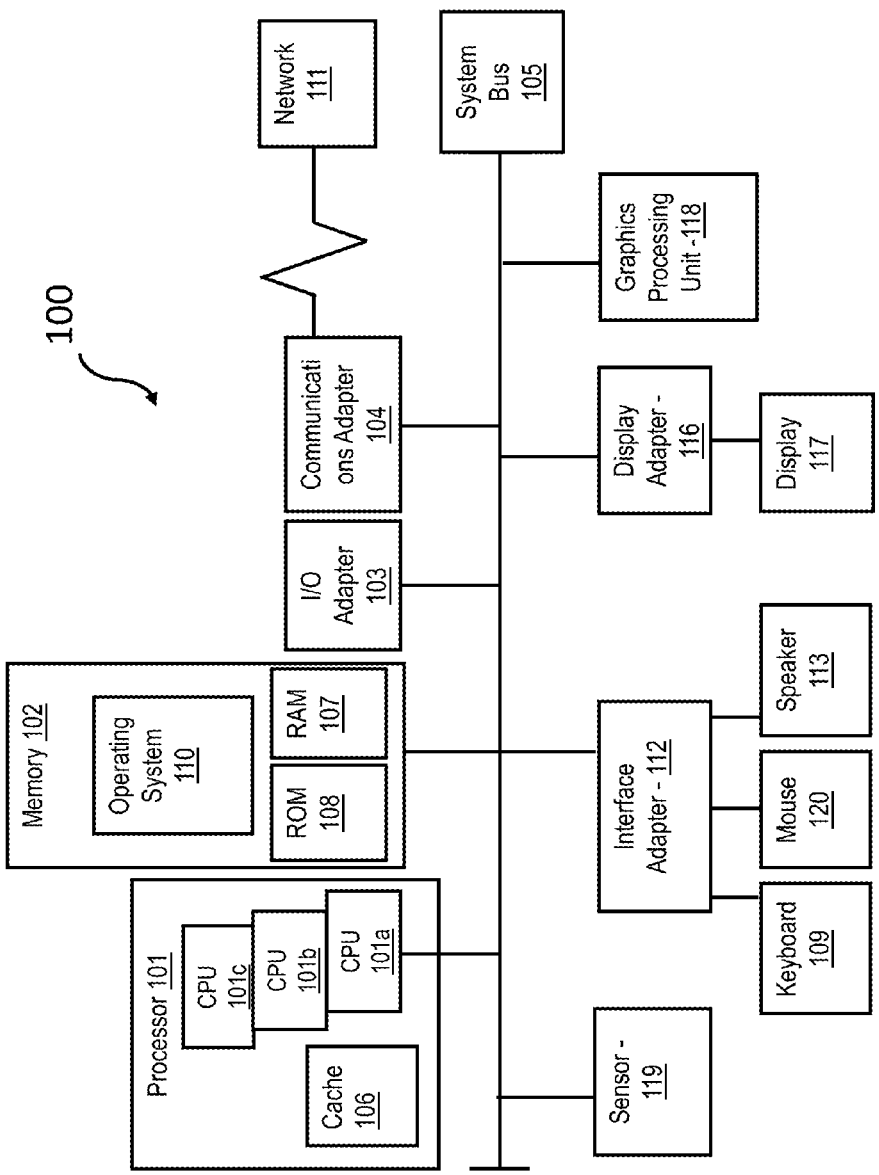
FIG. 1 depicts a block diagram of a computer system for implementing some or all aspects of the system and/or method in accordance with one or more embodiments.

A detailed description of one or more embodiments of the disclosed apparatus and method are presented herein by way of exemplification and not limitation with reference to the Figures.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to a system and method for clock-gating logic blocks using at least one control latch and a precise enable computation. For example, the precise enable computation includes processing data that includes the instruction received that is executing on the system, to determine if multicycle logic gates are needed to process the instruction, and turning them off when they are not.

For example, according to one or more embodiments, the instruction data is processed over a few initial cycles to determine if the instruction requires the multicycle logic block arranged together in a multicycle clock domain or not. During these initial few cycles, all of the logic blocks in the multicycle clock domain will remain on until a determination is made as to whether they are needed. This can be determined by looking at an opcode of the data for example. Further, once the precise enable computation is complete, if it is determined that the multicycle logic blocks will be needed then these blocks will remain on. Alternatively, if the instruction data processed indicates that the multicycle logic blocks in the multicycle clock domain are not needed then the logic block in the multicycle clock domain are deactivated. For example, the control latch can be used to disable the logic blocks in the multicycle clock domain.

Turning now to FIG. 1, an electronic computing device 100, which may also be called a computer system 100, that includes a plurality of electronic computing device sub-components is generally shown in accordance with one or more embodiments. Particularly, FIG. 1 illustrates a block diagram of a computer system 100 (hereafter "computer 100") for use in practicing the embodiments described herein.

The methods described herein can be implemented in hardware, software (e.g., firmware), or a combination thereof. In an exemplary embodiment, the methods described herein are implemented in hardware, and may be part of the microprocessor of a special or general-purpose digital computers, such as a personal computer, workstation, minicomputer, or mainframe computer. Computer 100, therefore, can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 120, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read-only memory (EPROM), flash memory, electronically erasable programmable read only memory (EEPROM), programmable read-only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Input/output adaptor 103 can be, for example, but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 120. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, any one of the electronic computing device sub-components of the computer 100 includes a circuit board connecting circuit elements that can process data in accordance with one or more embodiments using a control latch and logic block arranged in a pipeline clock domain and logic blocks arranged in a multicycle clock domain system and/or method as described herein.

Figure 2:
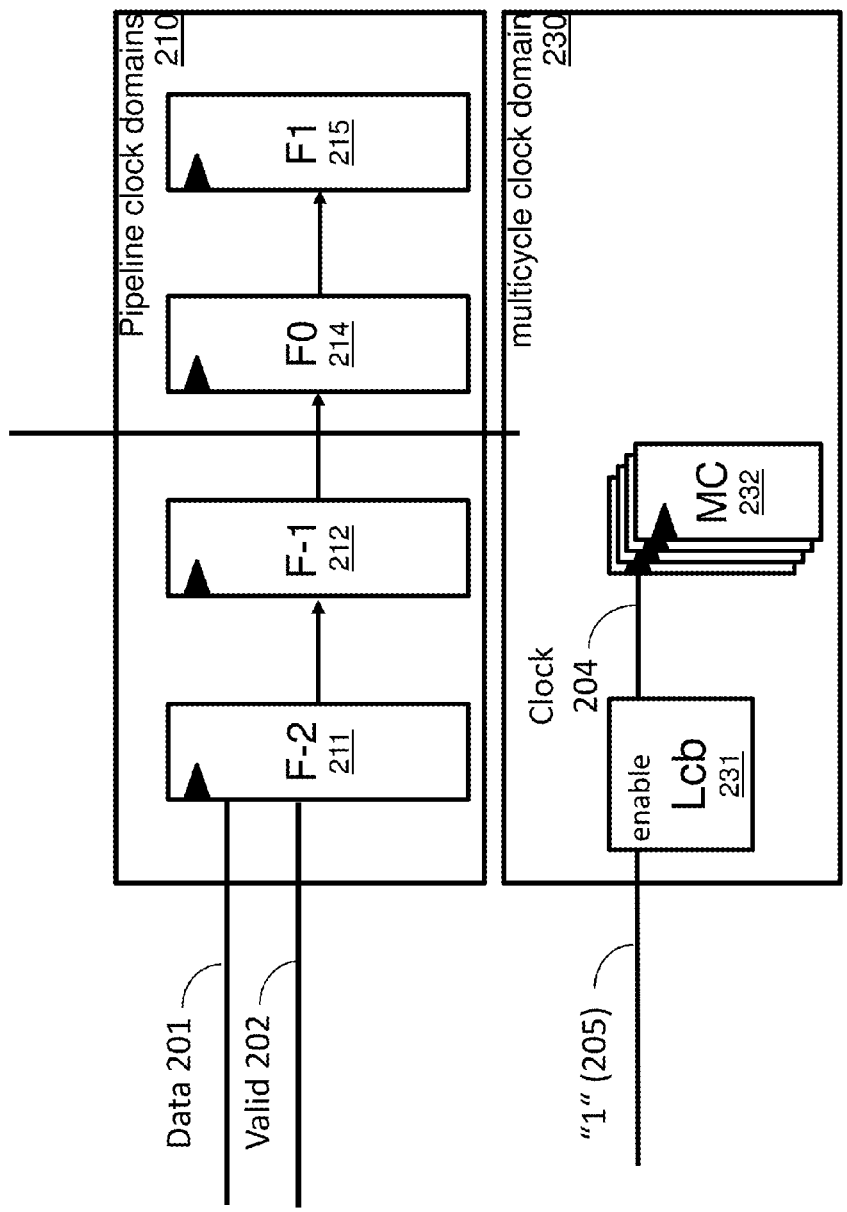
FIG. 2 is a block diagram that illustrates pipeline and multicycle logic blocks being used to run an instruction with operations by always running the multicycle logic blocks.

FIG. 2 is a block diagram that illustrates pipeline and multicycle logic blocks being used to run an instruction with operations by always running the multicycle logic blocks. Particularly, the logic blocks are first grouped into a pipeline clock domain 210 and a multicycle clock domain 230. According to another embodiment, the multicycle clock domain latches (230) may also be used for the pipelined operation (210). The multicycle logic blocks 232 are clocked using clock 204 and are enabled or disabled by a line circuit breaker (Lcb) 231 based on an input value 205. As shown in this example, the input value 205 is fixed to "1" thereby provided an enable command constantly for the multicycle logic blocks 232. This is done because initially, before any processing of an input instruction 201 is processed, it is unknown whether or not the multicycle logic blocks 232 are needed. Accordingly, they remain on in perpetuity just in case they are needed at some point during processing of the instruction 201.

Particularly, as shown, data 201, which is provided in the form of an instruction 201, as well as a valid signal 202 is provided to a logic block 211 in the pipeline clock domain 210. The logic block 211 begins processing the instruction as does the second logic block 212. It is not until this point at the earliest that enough processing has occurred that can indicate what, if any, of the multicycle logic blocks 232 are needed for processing the operations of the instruction 201. At this point, it is too late for the logic blocks in the multicycle clock domain to be turned on without performance impact (for example, a performance impact for delaying a multicycle instruction by two cycles) and thus the multicycle clock domain is always enabled for the duration of the processing regardless of use.

Figure 3:
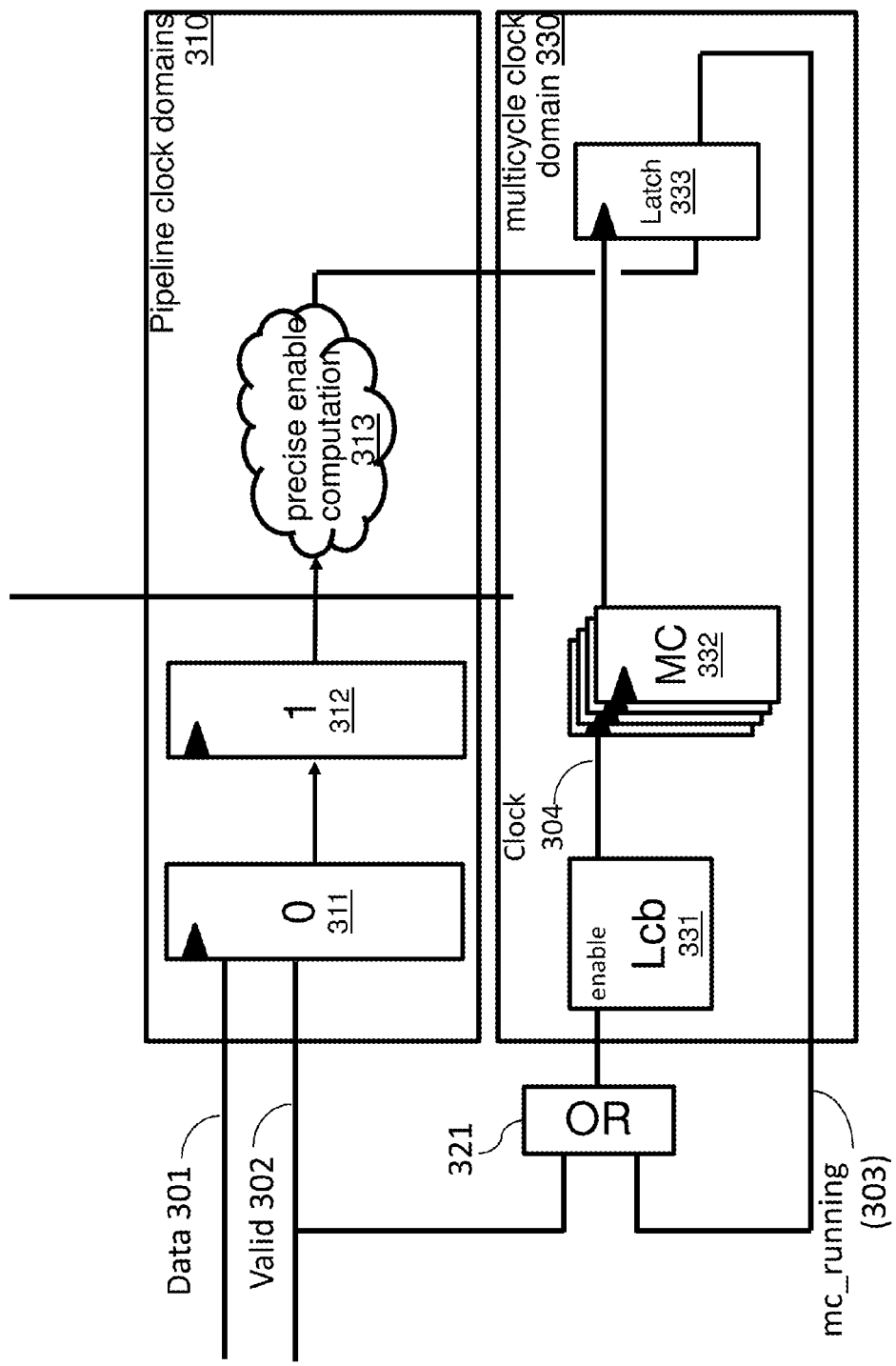
FIG. 3 is a block diagram that illustrates pipeline and multicycle logic blocks being used to run an instruction where the precise clock-gating is determined after two cycles for the multicycle operation running on the multicycle logic blocks in accordance with one or more embodiments.

FIG. 3 is a block diagram that illustrates pipeline and multicycle logic blocks being used to run an instruction where the precise clock-gating is determined after two cycles for the multicycle operation running on the multicycle logic blocks in accordance with one or more embodiments.

particularly, the logic blocks are first grouped into a pipeline clock domain 310 and a multicycle clock domain 330. The multicycle logic blocks 332 are clocked using clock 304 and are enabled or disabled by a line circuit breaker (Lcb) 331 based on an input value provided by an OR gate 321. As shown in this example, the input value is a combination of a valid signal input 302 and a mc-running signal value 303 which thereby provides an enable command depending on if either of those are enabled for the multicycle logic blocks 332. This is done because initially, before any processing of an input instruction 301 is processed, it is unknown whether or not the multicycle logic blocks 332 are needed. Accordingly, they remain on initially at the commencement of processing based on the valid 302 signal just in case they are needed at some point during processing of the instruction 301 later on.

Particularly, as shown, data 301, which is provided in the form of an instruction 301, as well as a valid signal 302 is provided to a logic block 311 in the pipeline clock domain 310. The logic block 310 (via 311 and 312) and optionally 330 (via 332) begins processing the instruction. It is not until this point at the earliest that enough processing has occurred that can indicate what, if any, of the multicycle logic blocks 332 are really needed for processing the operations of the instruction 301. This determination is done using a precise enable computation 313. This precise enable computation 313 provides an enable signal to a control latch 333 that is in the multicycle clock domain 330. The control latch 333 can then control the circuit breaker (331) that in turn clock gates other multicycle latches 332 based on the input from the precise enable computation 313. Specifically, the control latch 333 can send a signal 303, labeled mc_running, to the OR gate 321. At this point the valid signal 302 is likely zero so unless the control latch provides an enabling signal, the logic blocks 332 will be turned off. Thus, this provides the ability for the system to selectively keep on or turn off the logic blocks 332 depending on the needs calculated for the instruction data 301 in the pipeline clock domain 310 after a few cycles of operation.

Figure 4:
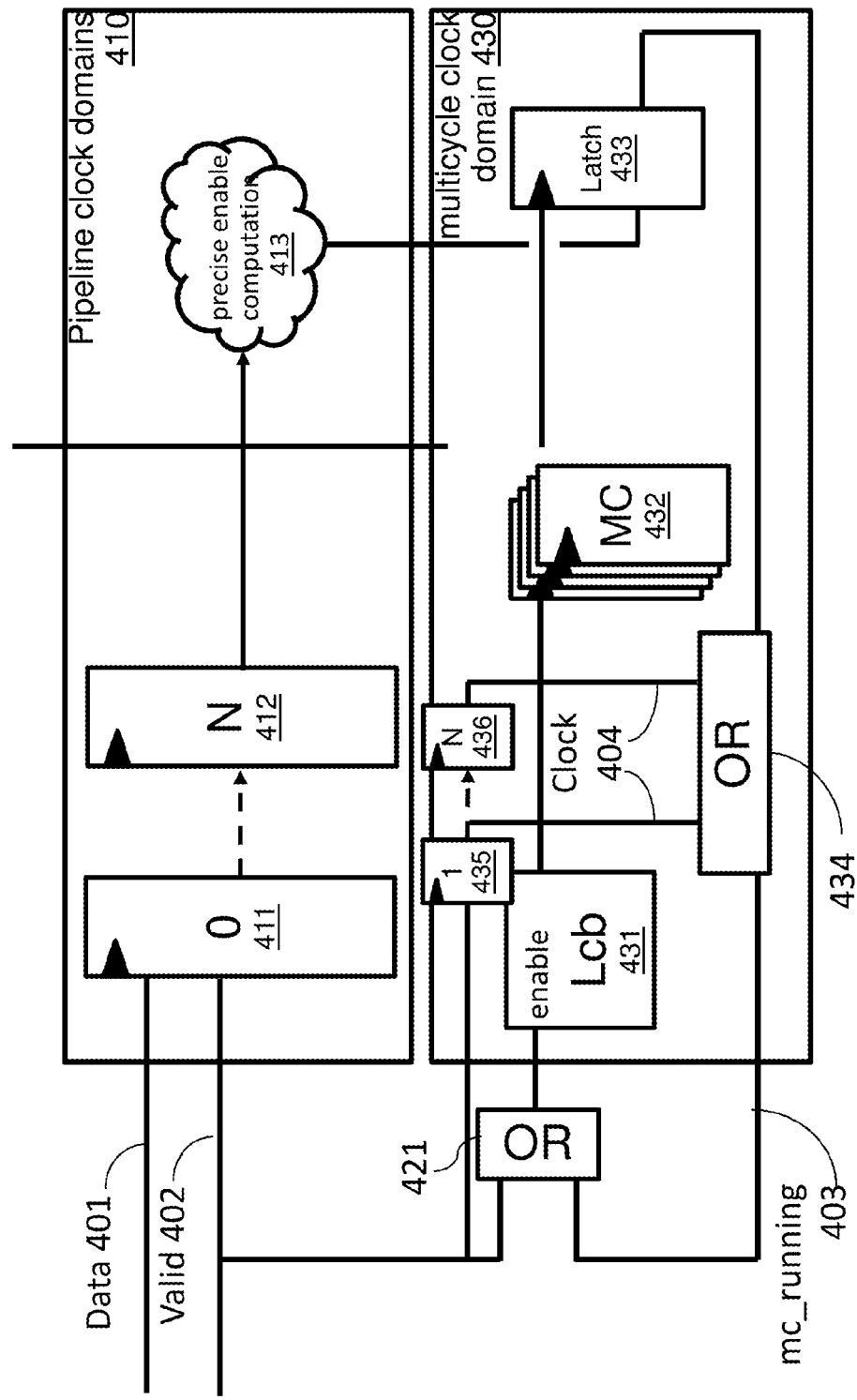
FIG. 4 is a block diagram that illustrates pipeline and multicycle logic blocks being used to run an instruction where the precise clock-gating is determined after N cycles for the multicycle operation running on the multicycle logic blocks in accordance with one or more embodiments.

FIG. 4 is a block diagram that illustrates pipeline and multicycle logic blocks being used to run an instruction where the precise clock-gating is determined after N cycles for the multicycle operation running on the multicycle logic blocks in accordance with one or more embodiments.

Particularly, the logic blocks are first grouped into a pipeline clock domain 410 and/or a multicycle clock domain 430. The multicycle logic blocks 432 are clocked using clock 404 and are enabled or disabled by a line circuit breaker (Lcb) 431 based on an input value provided by an OR gate 421. As shown in this example, the input value is a combination of a valid signal input 402 and a mc-running signal value 403 which thereby provides an enable command depending on if either of those are enabled for the multicycle logic blocks 432. This is done because initially, before any processing of an input instruction 401 is processed, it is unknown whether or not the multicycle logic blocks 432 are needed. Accordingly, they remain on initially at the commencement of processing based on the valid 302 signal just in case they are needed at some point during processing of the instruction 301 later on.

Particularly, as shown, data 401, which is provided in the form of an instruction 401, as well as a valid signal 402 is provided to a logic block 411 in the pipeline clock domain 410. The logic block 411 begins processing the instruction as does the second logic block N 412. It is not until this point at the earliest that enough processing has occurred that can indicate what, if any, of the multicycle logic blocks 432 are really needed for processing the operations of the instruction data 401. This determination is done using a precise enable computation 413. This precise enable computation 413 provides an enable signal to a control latch 433 that is in the multicycle clock domain 430. The control latch 433 can then control the other multicycle latches 432 based on the input from the precise enable computation 413. Specifically, the control latch 433 can send a signal 403, labeled mc_running, to the OR gate 421. At this point the valid signal 402 is likely zero so unless the control latch provides an enabling signal, the logic blocks 432 will be turned off. Further, the valid signal 402 may go to zero before the precise enable computation 413 is able to keep the clocks (404) on in the case when N number of cycles and logic blocks are needed to get to a point when such a precise clock-gating value can be calculated.

Therefore, according to one or more embodiments, additional holding logic can be provided to hold the multicycle logic blocks 432 on for N number of cycles. Specifically, an additional OR gate 434 can be added along with N number of holding latches 435 through 436. The additional OR gate 434 and N number of holding latches 435 through 436 can provide an enable signal to the OR gate 421 that will continue to enable the multicycle logic blocks 432 for N number of cycles until the precise clock-gating (413) is available. As shown, the number of holding latches is the same as the number of cycles and logic gates needed in the pipeline clock domain to get to a point that a determination can be made.

Thus, this provides the ability for the system to selectively keep on or turn off the logic blocks 432 depending on the needs calculated for the instruction data 401 in the pipeline clock domain 410 after N number of cycles of operation.

Figure 5:
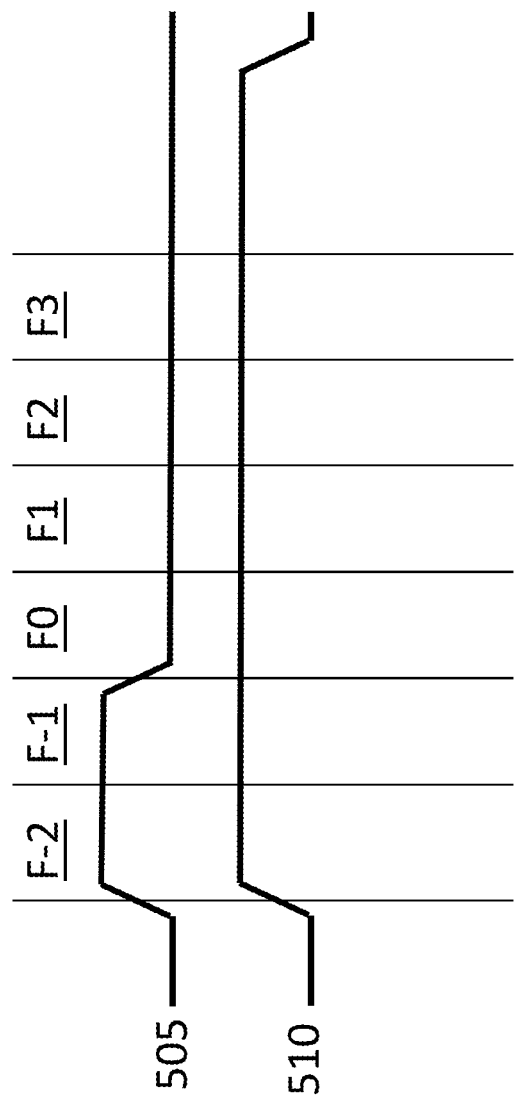
FIG. 5 is a timing diagram for a clock-enable signal that controls multicycle logic blocks based on a precise enable computation taking two cycles in accordance with one or more embodiments.

FIG. 5 is a timing diagram for a clock enable signal that controls multicycle logic blocks based on a precise enable computation taking two cycles in accordance with one or more embodiments. According to one or more embodiments, the clock enable signal of FIG. 5 is also the control signal going to the LCB (331) shown in FIG. 3. Looking again at FIG. 5, there are two different behaviors shown for this signal depending on if there is a MC-op (510) or not (505). For example, as shown, the diagram depicts these two different cases. A first case that corresponds to a non MC-instr where the clock enable 505 is turned off after two cycles because the multicycle logic blocks are not needed for processing. A second case that corresponds to a MC-instr where the clock enable 510 stays on during the duration of the multi-cycle instruction because the multicycle logic blocks are needed for processing. In the first case, the enable signal 505 for the multicycle clock domain is active for two cycles (F-2 and F-1) only, and then it is turned off if the multicycle logic gates are not needed. In the second case where multicycle logic block operation is needed, the enable signal 510 remains active for all cycles (F-2, F-1, F0, F1, F2, and F3) until the multicycle operation ends.

Figure 6:
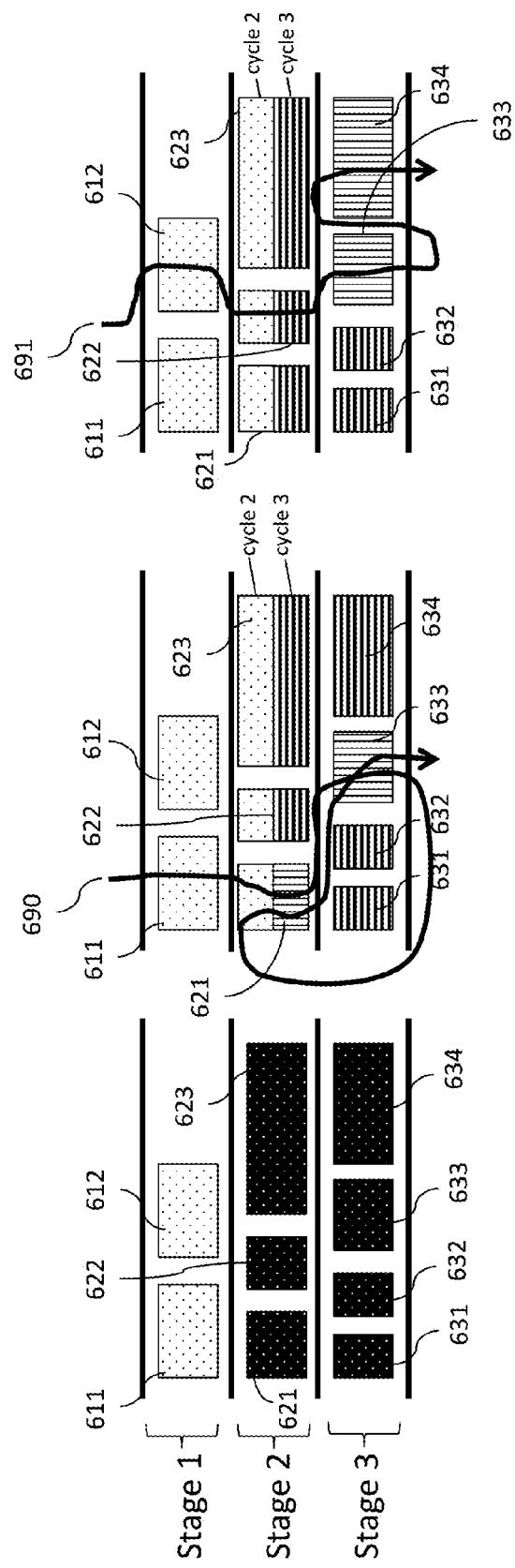
FIG. 6A is a block diagram of logic blocks at different stages of an instruction executing operations using a pipeline and multicycle logic blocks.
FIG. 6B is a block diagram of logic blocks at different stages of an instruction executing operations using a pipeline and multicycle logic blocks according to one or more embodiments.
FIG. 6C is a block diagram of logic blocks at different stages of an instruction executing operations using a pipeline and multicycle logic blocks according to one or more embodiments.

FIGS. 6A-6C show block diagrams of logic blocks at different stages. As shown the logic blocks are shaded with different patterns that indicate different operating states. For example, logic blocks that are white with small black dots are always on or directly controlled by a valid signal (for example logic blocks 611 and 612). According to an embodiment, the controlling valid signal can be, for example, the valid signal 302 as shown in FIG. 3. Further, blocks that are also always on or based on the valid signal can be indicated by the blocks with white dots (See FIG. 6A block 621 for example). Further, blocks can be filled with a horizontal line pattern that indicates blocks that are selectively turned off (See FIG. 6B block 622 for example). Additionally, blocks can be filled with a vertical line pattern that indicates the blocks are selectively turned on for use (See FIG. 6B block 621 for example).

Turning now to FIG. 6A, a block diagram is shown of logic blocks at different stages (Stage 1, Stage 2, and Stage 3) of an instruction executing operations using a pipeline and multicycle logic blocks. As shown only three stages are shown for exemplary purposes but more or less stages can be provided in an instruction in accordance with one or more embodiments. As shown in FIG. 6A in a first stage 1, logic block 611 and 612 are shown and being on. This is always the case because initially, as discussed above, it is not possible to know whether the blocks are needed or not so they will always be provided in an on state initially. During, Stage 2 blocks 621, 622, and 623 are shown as also always being on. This is because FIG. 6A corresponds to a system as shown in FIG. 2 which is unable to selectively turn logic block on or off. Thus, is follows that the blocks 631, 632, 633, and 634 in Stage 3 are all also turned on in case they are needed even if they are never used.

Turning now to FIG. 6B, instruction 690 is shown traversing through the different stages using different blocks as it does so. FIG. 6B is a block diagram of logic blocks at different stages of an instruction executing operations using a pipeline and multicycle logic blocks according to one or more embodiments. As shown in Stage 1, both blocks 611 and 612 are initially on because not enough time has passed for the system to processes what blocks are needed and which are not so to be safe both are on. Also by the time Stage 2 is set to commence still not enough time has passed to decide which blocks are needed, so all blocks are activated. In the third cycle enough time has passed that a precise enable computation has occurred and the blocks that are needed have been identified. Specifically, as shown block 621 in Stage 2 and block 633 in Stage 3 are on as those are the ones the instruction 690 will use. The other blocks 622, 623 in Stage 2 and blocks 631, 632, and 634 are all turned off.

Turning now to FIG. 6C, instruction 691 is shown traversing through the different stages using different blocks as it does so. FIG. 6C is a block diagram of logic blocks at different stages of an instruction executing operations using a pipeline and multicycle logic blocks according to one or more embodiments. As shown in Stage 1, both blocks 611 and 612 are initially on because not enough time has passed for the system to processes what blocks are needed and which are not so to be safe both are on. By the time Stage 2 is set to commence enough time has passed that a precise enable computation has occurred and the blocks that are needed have been identified. Specifically, as shown blocks 633 and 634 in Stage 3 are on as those are the ones the instruction 691 will use. The other blocks 621, 622, and 623 in Stage 2 and blocks 631 and 632 are all turned off.

Figure 7:
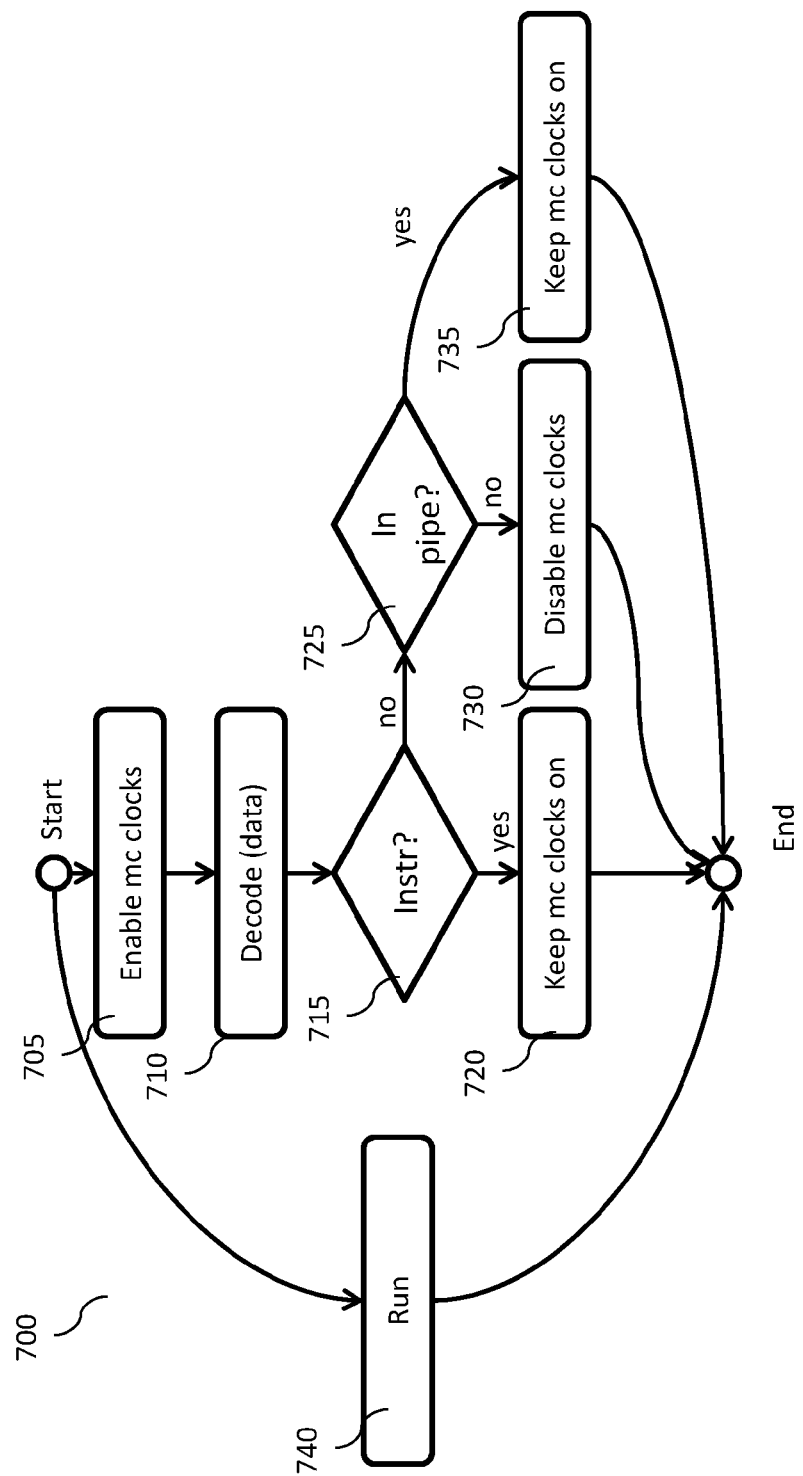
FIG. 7 is a flowchart of a method of clock-gating for multicycle operations of an instruction in accordance with one or more embodiments.

FIG. 7 is a flowchart of a method 700 of clock-gating for multicycle operations of an instruction in accordance with one or more embodiments. Initially, the method 700 enables all multicycle (MC) clocks (operation 705). The method further includes computing a precise enable computation value after a plurality of cycles of executing an instruction. This enable computation value can be used to determine what clocks to disable and thereby disabling one or more of the subset of multicycle (MC) logic blocks based on the precise enable computation value. This can be done by decoding the data (710) and then determining if the data is an instruction (715) and where the instruction will resides (725). This information that makes up the enable computation value can include the decoded instruction along with the identification of the type and location of the instruction. Specifically, as shown in FIG. 7, the method 700 decodes the instruction code from the received data instruction (operation 710). This is done because the instruction of an instruction can indicate at times whether operations of the instruction will need MC logic blocks or only pipelined logic blocks. It follows that the method 700 then checks to see if the decoded instruction is one that corresponds to MC logic block usage which can be called an MC instruction (operation 715). If the operation/instruction is an MC instruction then the MC logic blocks are needed and will remain on by keeping the clocks on to the MC logic blocks (operation 720). If they are not MC instruction then the method 700 checks to see if the instruction is in the pipeline processing further or not (operation 725). If it is the method 700 keeps the mc clocks on (operation 735) long enough until it can be determined if the instruction is a MC instruction then the method 700 disables the mc clocks (operation 730). All the while the operation can be running (operation 740).

FIG. 8 is a table that indicates some examples of the instruction that are detected in the payload of the received data for the instructions and what they correspond too in accordance with one or more embodiments. This represents only a small example set of potential examples that can be included in accordance with one or more embodiments and is not meant to limit to only these shown as other could also be included. For example, received data can be processed and it can be determined that contains an "Add32" operation instruction. In this case, this operation does not require MC logic blocks as indicated by the third column and thus when this is detected the MC logic blocks can be turned off. Alternatively, if the received data is processed and it is determined that the data contains a "Mutiply64" operation instruction for example, and then it is known that MC logic blocks are needed as indicated in the third column. Accordingly, in this case when the precise enable computation is able to detect this or any of the others the then the MC logic blocks are left on for use by the instruction. This list is not exhaustive and is only meant to show a few examples of data operation instructions that can be detected and used to determine the precise enable computation for turning MC logic gates on or off.

Figure 9:
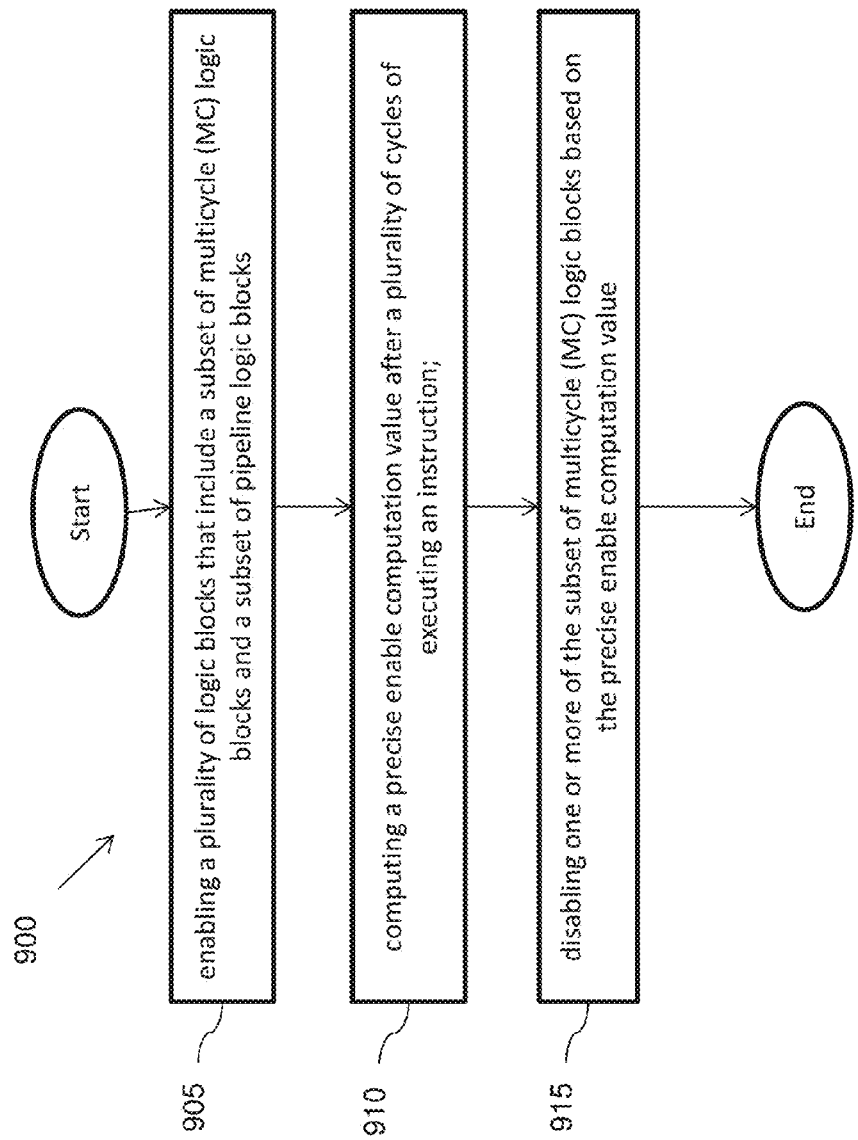
FIG. 9 is a flow chart of a method of clock-gating for multicycle operations of an instruction in accordance with one or more embodiments.

FIG. 9 is a flow chart of a method 900 of clock-gating for multicycle operations of an instruction in accordance with one or more embodiments. The method 900 includes enabling a plurality of logic blocks that include a subset of multicycle (MC) logic blocks and a subset of pipeline logic blocks (operation 905). The method 900 further includes computing a precise enable computation value after a plurality of cycles of executing an instruction (operation 910). Further, the method 900 includes disabling one or more of the subset of multicycle (MC) logic blocks based on the precise enable computation value (operation 915). According to one or more embodiments, at least the subset of pipeline logic blocks needed to compute the instruction remains on.

According to one or more embodiments, the method can further include computing an imprecise enable computation value before execution of the instruction begins. According to one or more embodiments, the method can further include enabling an imprecise startup subset of logic blocks from the plurality of logic blocks based on the imprecise enable computation value. According to one or more embodiments, the imprecise startup subset includes one or more of the multicycle logic blocks and one or more of the pipeline logic blocks.

According to one or more embodiments, the method can further include grouping the subset of pipeline logic blocks from the plurality of logic blocks into a pipeline clock domain, and grouping the subset of MC logic blocks from the plurality of logic blocks into a MC clock domain. According to one or more embodiments, the method can further include holding the plurality of logic blocks enabled for the plurality of cycles needed to compute the precise enable computation value using at least a control latch and an OR gate. According to one or more embodiments, the OR gate provides an output signal to a line circuit breaker (Lcb), or any other way and means to prevent the latches from clocking, and then processes the received output signal from the OR gate and provides one of an enable clock signal and a disable signal to the plurality of MC logic blocks based on the received output signal. According to one or more embodiments, the OR gate receives inputs from the control latch and a valid input signal that is received.

According to one or more embodiments, the method can further include holding the plurality of logic blocks enabled for the plurality of cycles needed to compute the precise enable computation value using at least a control latch and an OR gate. According to one or more embodiments, the control latch is provided in the MC clock domain. According to one or more embodiments, the OR gate is provided outside both the MC clock domain and the pipeline clock domain. According to one or more embodiments, the method can further include holding the plurality of logic blocks enabled for the plurality of cycles needed to compute the precise enable computation value using at least a control latch, at least one OR gate, at least one holding latch.

According to one or more embodiments, the method can further include holding the plurality of logic blocks enabled for the plurality of cycles needed to compute the precise enable computation value using at least a control latch, a first OR gate, a second OR gate, a first holding latch, and a second holding latch. According to one or more embodiments, the first holding latch and the second holding latch each provide an additional cycle of holding. According to one or more embodiments, a plurality of holding latches and corresponding OR gates are provided to hold the plurality of logic blocks for a plurality of cycles equal to the number of holding latches in the plurality of holding latches.

One or more embodiments and described here may reduce the average power consumed by being able to turn off MC logic blocks that can each contain hundreds or thousands of latches. According to one or more embodiments, an imprecise existing signal can be used to turn on the logic blocks when needed to allow for proper operation. According to one or more embodiments, permanent clocked staging latches of a processor arithmetic execution unit can be provided that are dependent on executed operation/instruction. The instruction is processed such that is can be differentiated between being a multicycle instruction and a non-multicycle instruction. Clock gating can then switch off clocks of latches that correspond to MC logic blocks to save power. According to one or more embodiments, MC logic blocks are grouped such that all control-latches for multicycle-instructions are together in a special clock-domain that can be activated whenever a multicycle operation is active in the arithmetic processor unit.

For example, according to one or more embodiments, a single additional latch can be used to help decode the opcode one cycle longer, do a predictive enabling of the multicycle-clock and after the extended decode of one additional cycle, decide if one needs to continue clocking these latches or stop clocking after a prediction that indicates MC logic blocks are not needed.

According to one or more embodiments, to save power, all control-latches for multicycle-instructions are grouped together into a special clock-domain that should be activated whenever a multicycle operation is active in the system, core, and/or execution unit. An issue here is a need to activate this clock very fast, as many latches already need to get clocked in the very first cycle of such an instruction being executed. Activation of this clock needs to do a fast opcode-decode to extract all these multicycle-instructions to enable their clocking fast enough. In many cases they cannot be turned on fast enough. Thus, according to one or more embodiments, in a predictive way one can activate this multicycle-clock for all new instructions getting issued to the system and extend the time needed to analyze the new instructions opcode by an additional cycle. With help of this additional cycle, one can inspect the opcode more precisely and check if the newly issued instruction needs multicycle-clocking.

Further, according to one or more embodiments, if the new op is not such a multicycle-operation, one can turn off this special clock again, and therefore only one cycle is run consuming the energy to power these latches, and only keep them running, when the opcode being handled really needs this additional clocking. This embodiment is safe and saves power compared to clocking all the latches permanently. Realization of this system and method uses one additional control latch responsible for holding the multicycle-clock active. This latch gets reset when the opcode does not require this clock to stay active. At the end of such multi-cycle-operations being processed, this control latch can also get reset.

According to one or more embodiments, a system with multiple stages, containing multiple blocks of logic that do not need all to be active for all operations can be provided. However, the information that indicates which blocks are needed is not precisely available when the operation starts. Accordingly, in one or more embodiments, logic is provided that turns on all blocks stage by stage based on the imprecise requirement signal when the operation starts and will compute a precise block requirement during execution and turn off the blocks not required at that point based on the perceive block requirement calculated. According to one or more embodiments, an imprecise signal marking a multicycle operation that will turn on all logic in the first stage of the pipeline and disable in the subsequence stages of the pipeline all unnecessary blocks can be provided. Further, according to another embodiment, an imprecise signal for a pipelined operation, that will turn off each stage of the pipeline one by one but stop doing so as soon as it is detected that e.g. the instruction does not need to deliver a result (interrupt), can be provided.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of clock-gating for multicycle instructions, the method comprising:
    enabling a plurality of logic blocks that include a subset of multicycle (MC) logic blocks and a subset of pipeline logic blocks, wherein the enabling is based on a combination of a valid signal and an MC running signal;
    computing a precise enable computation value in a pipeline domain after a plurality of cycles of executing an instruction;
    determining that no instructions correspond to the subset of MC logic blocks, disabling one or more of the subset of MC logic blocks based on the precise enable computation value,
    wherein the precise enable computation value includes a decoded instruction, identification of a type, and a location of the decoded instruction,
    wherein at least the subset of pipeline logic blocks needed to compute the instruction remain on; and holding the plurality of logic blocks enabled for the plurality of cycles needed to compute the precise enable computation value using at least a control latch and an OR gate, wherein the OR gate receives both the valid bit and an MC running signal from the control latch, wherein the OR gate and the pipeline clock domain simultaneously receive the valid bit, wherein the control latch receives the precise enable computation value.

2. The method of claim 1, further comprising:
computing an imprecise enable computation value before execution of the instruction begins; and
enabling an imprecise startup subset of logic blocks from the plurality of logic blocks based on the imprecise enable computation value,
wherein the imprecise startup subset includes one or more of the MC logic blocks and one or more of the pipeline logic blocks.

3. The method of claim 1, further comprising:
grouping the subset of pipeline logic blocks from the plurality of logic blocks into a pipeline clock domain; and
grouping the subset of MC logic blocks from the plurality of logic blocks into a MC clock domain.

4. The method of claim 1, wherein the OR gate at least provides an output signal to a line circuit breaker (Lcb) that processes a received output signal from the OR gate and provides one of an enable clock signal and a disable signal to the subset of MC logic blocks based on the received output signal.

5. The method of claim 1, wherein the OR gate receives inputs from the control latch and a valid input signal that is received.

6. The method of claim 3, further comprising:
holding the plurality of logic blocks enabled for the plurality of cycles needed to compute the precise enable computation value using at least a control latch and an OR gate,
wherein the control latch is provided in the MC clock domain, and
wherein the OR gate is provided outside both the MC clock domain and the pipeline clock domain.

7. The method of claim 1, further comprising:
holding the plurality of logic blocks enabled for the plurality of cycles needed to compute the precise enable computation value using at least a control latch, at least one OR gate, and at least one holding latch.

8. The method of claim 1, further comprising:
holding the plurality of logic blocks enabled for the plurality of cycles needed to compute the precise enable computation value using at least a control latch, a first OR gate, a second OR gate, a first holding latch, and a second holding latch,
wherein the first holding latch and the second holding latch each provide an additional cycle of holding.

9. The method of claim 1, wherein a plurality of holding latches and corresponding OR gates are provided to hold the plurality of logic blocks for a plurality of cycles equal to a number of holding latches in the plurality of holding latches.

10. A system for clock-gating for multicycle instructions, the system comprising:
a memory having computer readable instructions; and
a processor configured to execute the computer readable instructions, the computer readable instructions when executed perform functions of comprising:
enabling, in the processor, a plurality of logic blocks that include a subset of multicycle (MC) logic blocks and a subset of pipeline logic blocks, wherein the enabling is based on a combination of a valid signal and an MC running signal;
computing, using the processor, a precise enable computation value after a plurality of cycles of executing an instruction;
determining that no instructions correspond to the subset of MC logic blocks, disabling, in the processor, one or more of the subset of MC logic blocks based on the precise enable computation value, wherein the precise enable computation value includes a decoded instruction, identification of a type, and a location of the decoded instruction,
wherein at least the subset of pipeline logic blocks needed to compute the instruction remain on; and
holding the plurality of logic blocks enabled for the plurality of cycles needed to compute the precise enable computation value using at least a control latch and an OR gate, wherein the OR gate receives both the valid bit and an MC running signal from the control latch, wherein the OR gate and the pipeline clock domain simultaneously receive the valid bit, wherein the control latch receives the precise enable computation value.

11. The system of claim 10, the computer readable instructions when executed perform further functions of
computing, using the processor, an imprecise enable computation value before execution of the instruction begins; and
enabling, in the processor, an imprecise startup subset of logic blocks from the plurality of logic blocks based on the imprecise enable computation value,
wherein the imprecise startup subset includes one or more of the MC logic blocks and one or more of the pipeline logic blocks.

12. The system of claim 10, the computer readable instructions when executed perform further functions of
grouping, using the processor, the subset of pipeline logic blocks from the plurality of logic blocks into a pipeline clock domain; and
grouping, using the processor, the subset of MC logic blocks from the plurality of logic blocks into a MC clock domain.

13. The system of claim 12, the computer readable instructions when executed perform further functions of
holding the plurality of logic blocks enabled for the plurality of cycles needed to compute the precise enable computation value using at least a control latch and an OR gate,
wherein the control latch is provided in the MC clock domain, and
wherein the OR gate is provided outside both the MC clock domain and the pipeline clock domain.

14. The system of claim 10, the computer readable instructions when executed perform further functions of
holding the plurality of logic blocks enabled for the plurality of cycles needed to compute the precise enable computation value using at least a control latch, at least one OR gate, and at least one holding latch.

15. The system of claim 10, the computer readable instructions when executed perform further functions of
holding the plurality of logic blocks enabled for the plurality of cycles needed to compute the precise enable computation value using at least a control latch, a first OR gate, a second OR gate, a first holding latch, and a second holding latch, wherein the first holding latch and the second holding latch each provide an additional cycle of holding.

16. The system of claim 10, wherein a plurality of holding latches and corresponding OR gates are provided to hold the plurality of logic blocks for a plurality of cycles equal to a number of holding latches in the plurality of holding latches.

17. A computer program product for clock-gating for multicycle instructions, the computer program product comprising a computer readable storage medium having program instructions embodied therewith, the program instructions executable by a processor to cause the processor to:

enable a plurality of logic blocks that include a subset of multicycle (MC) logic blocks and a subset of pipeline logic blocks, wherein the enabling is based on a combination of a valid signal and an MC running signal;

compute a precise enable computation value after a plurality of cycles of executing an instruction;

determining that no instructions correspond to the subset of MC logic blocks, disable one or more of the subset of MC logic blocks based on the precise enable computation value, wherein the precise enable computation value includes a decoded instruction, identification of a type, and a location of the decoded instruction, wherein at least the subset of pipeline logic blocks needed to compute the instruction remain on; and holding the plurality of logic blocks enabled for the plurality of cycles needed to compute the precise enable computation value using at least a control latch and an OR gate, wherein the OR gate receives both the valid bit and an MC running signal from the control latch, wherein the OR gate and the pipeline clock domain simultaneously receive the valid bit, wherein the control latch receives the precise enable computation value.

* * * * *